US010676075B2

(12) United States Patent
Kim

(10) Patent No.: US 10,676,075 B2
(45) Date of Patent: Jun. 9, 2020

(54) ELECTRIC BRAKE SYSTEM

(71) Applicant: MANDO CORPORATION, Pyeongtaek-si, Gyeonggi-do (KR)

(72) Inventor: Jong-Wook Kim, Seoul (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 12 days.

(21) Appl. No.: 15/793,826

(22) Filed: Oct. 25, 2017

(65) Prior Publication Data
US 2018/0111594 A1 Apr. 26, 2018

(30) Foreign Application Priority Data
Oct. 26, 2016 (KR) .................. 10-2016-0140052

(51) Int. Cl.
B60T 13/74 (2006.01)
B60T 8/40 (2006.01)
(Continued)

(52) U.S. Cl.
CPC ............ B60T 13/745 (2013.01); B60T 8/17 (2013.01); B60T 8/4081 (2013.01); B60T 11/26 (2013.01); B60T 13/142 (2013.01); B60T 13/686 (2013.01)

(58) Field of Classification Search
CPC ...... B60T 8/4081; B60T 7/042; B60T 13/686; B60T 8/4077; B60T 13/146;
(Continued)

(56) References Cited

U.S. PATENT DOCUMENTS 4,404,803 A * 9/1983 Steffes .................. B60T 13/146
188/347
4,483,144 A * 11/1984 Steffes .................... B60T 8/445
303/114.1
(Continued)

FOREIGN PATENT DOCUMENTS

CN 103038110 A 4/2013
CN 104417512 A 3/2015
(Continued)

OTHER PUBLICATIONS

Office Action issued in corresponding Chinese Application No. 201711018406.2, dated Jul. 15, 2019.

Primary Examiner — Bradley T King
Assistant Examiner — Mahbubur Rashid
(74) Attorney, Agent, or Firm — Morgan, Lewsi & Bockius LLP

(57) ABSTRACT

Disclosed is an electric brake system. The electric brake system includes a reservoir configured to store oil, a master cylinder connected to the reservoir, provided with first and second master chambers and first and second pistons respectively provided at the first and second master chambers, and configured to discharge oil according to pedal effort of a brake pedal; a hydraulic pressure supply device operated to generate a hydraulic pressure by an electrical signal output in response to displacement of the brake pedal; and a hydraulic pressure control unit configured to deliver the hydraulic pressure discharged from the hydraulic pressure supply device to a wheel cylinder provided at each of wheels, wherein the reservoir includes a first reservoir chamber connected to the master cylinder and configured to supply the oil thereto, and a second reservoir chamber connected to the hydraulic pressure supply device, config- (Continued)

ured to supply the oil thereto and provided to be separated from the first reservoir chamber.

18 Claims, 4 Drawing Sheets

(51) Int. Cl.
*B60T 11/26* (2006.01)
*B60T 8/17* (2006.01)
*B60T 13/14* (2006.01)
*B60T 13/68* (2006.01)

(58) Field of Classification Search
CPC ........ B60T 13/142; B60T 13/148; B60T 8/17; B60T 11/26; B60T 13/745
See application file for complete search history.

(56) References Cited

U.S. PATENT DOCUMENTS

| | | | | |
|---|---|---|---|---|
| 4,629,258 A * | 12/1986 | Resch | ................. | B60T 8/445 303/113.4 |
| 4,641,894 A * | 2/1987 | Belart | ................. | B60T 8/446 303/114.1 |
| 4,736,992 A * | 4/1988 | Hendrickson | ........... | B60T 8/885 303/114.1 |
| 4,750,788 A * | 6/1988 | Seibert | ................. | B60T 8/445 303/113.2 |
| 4,761,042 A * | 8/1988 | Seibert | ................. | B60T 8/347 188/DIG. 1 |
| 4,768,842 A * | 9/1988 | Ogino | ................. | B60T 8/4004 303/114.1 |
| 4,803,840 A * | 2/1989 | Seibert | ................. | B60T 8/4036 303/113.4 |
| 4,919,496 A * | 4/1990 | Burgdorf | ............. | B60T 8/4036 303/10 |
| 5,002,345 A * | 3/1991 | Becker | ................. | B60T 8/445 303/113.1 |
| 5,171,072 A * | 12/1992 | Maehara | ................. | B60T 8/441 303/11 |
| 6,899,403 B2 * | 5/2005 | Isono | ................. | B60T 8/4018 303/11 |
| 8,333,442 B2 * | 12/2012 | Hatano | ................. | B60T 8/4081 303/11 |
| 8,899,695 B2 * | 12/2014 | Tanaka | ................. | B60T 13/745 303/14 |
| 9,221,443 B2 * | 12/2015 | Ganzel | ................. | B60T 8/34 |
| 2002/0117891 A1 * | 8/2002 | Harris | ................. | B60T 7/042 303/20 |
| 2010/0164276 A1 * | 7/2010 | Schluter | ................. | B60T 7/042 303/15 |
| 2011/0285197 A1 * | 11/2011 | Ganzel | ................. | B60T 7/042 303/2 |
| 2015/0061366 A1 * | 3/2015 | Shimada | ................. | B60T 13/146 303/15 |
| 2015/0166024 A1 * | 6/2015 | Biller | ................. | B60T 8/172 701/93 |
| 2015/0175146 A1 * | 6/2015 | Quirant | ................. | B60T 13/662 303/14 |
| 2015/0224972 A1 * | 8/2015 | Feigel | ................. | B60T 8/4081 303/15 |
| 2016/0009263 A1 * | 1/2016 | Feigel | ................. | B60T 8/321 303/15 |
| 2016/0114775 A1 * | 4/2016 | Ishino | ................. | B60T 7/042 701/70 |
| 2016/0121866 A1 * | 5/2016 | Ozeki | ................. | B60T 7/042 303/15 |
| 2016/0152219 A1 * | 6/2016 | Besier | ................. | B60T 7/042 303/15 |
| 2016/0152223 A1 * | 6/2016 | Bauer | ................. | B60T 13/745 303/14 |
| 2016/0159332 A1 * | 6/2016 | Yang | ................. | B60T 13/142 303/15 |
| 2016/0375886 A1 * | 12/2016 | Jung | ................. | B60T 13/686 303/15 |

FOREIGN PATENT DOCUMENTS

| | | |
|---|---|---|
| CN | 105644539 A | 6/2016 |
| CN | 105691372 A | 6/2016 |

* cited by examiner

ELECTRIC BRAKE SYSTEM

This application claims the benefit of Korean Patent Application No. 2016-0140052, filed on Oct. 16, 2016 in the Korean Intellectual Property Office, the disclosure of which is incorporated herein by reference.

BACKGROUND

1. Field

Embodiments of the present disclosure relate to an electric brake system, and more particularly, to an electric brake system configured to generate a braking force using an electrical signal.

2. Description of the Related Art

Generally, a reservoir is a tank for storing brake fluid or hydraulic oil of a power steering device.

Specifically, a brake reservoir tank in which brake fluid is stored is disposed above a master cylinder to store brake fluid supplied thereto to the master cylinder, and is configured to detect a residual amount of the brake fluid and operate a warning lamp to inform a driver of the detected residual amount.

A brake system, which is configured such that oil is discharged from a master cylinder to be directly delivered a wheel cylinder and generate a braking force, is typically used. Recently, however, an electric brake system, which separately includes a hydraulic pressure supply device provided with, for example, a pump capable of supplying a hydraulic pressure to a wheel cylinder, is used. The hydraulic pressure supply device may be operated by an electronic signal to deliver oil to the wheel cylinder, thereby generating a braking force.

For example, such an electric brake system may be used in an anti-lock brake system (ABS) for preventing sliding of a wheel while braking, a brake traction control system (BTCS) for preventing slippage of a driving wheel when a vehicle is suddenly and unintentionally or intentionally accelerated, an electronic stability control (ESC) system for stably maintaining a driving state of a vehicle by combining an ABS with traction control to control a hydraulic pressure of a brake, and the like.

A reservoir used in the electric brake system may be divided into two internal chambers in case a braking system operated by the electronic signal fails. However, in the above-described case, efficiency of the hydraulic pressure supply device may be deteriorated while ABS control is performed.

Also, when the two inner chambers of the reservoir are respectively connected to two chambers of the master cylinder, one of the two inner chambers of the reservoir is inevitably connected to the hydraulic pressure supply device. However, in the case in which the master cylinder and the hydraulic pressure supply are not independently provided, when a failure occurs in connection of one of the two inner chambers, problems may occur in an emergency braking operation as well as a normal braking operation.

SUMMARY

Therefore, it is an aspect of the present disclosure to provide an electric brake system capable of maintaining braking efficiency of a hydraulic pressure supply device while anti-lock brake system (ABS) control is performed and allowing a master cylinder and a hydraulic pressure supply device to be independently operable by connecting an inner chamber of a reservoir to a hydraulic pressure circuit.

Additional aspects of the disclosure will be set forth in part in the description which follows and, in part, will be obvious from the description, or may be learned by practice of the disclosure.

In accordance with one aspect of the present disclosure, an electric brake system including a reservoir configured to store oil; a master cylinder connected to the reservoir, provided with first and second master chambers and first and second pistons respectively provided at the first and second master chambers, and configured to discharge oil according to pedal effort of a brake pedal; a hydraulic pressure supply device operated by an electrical signal and configured to generate a hydraulic pressure; and a hydraulic pressure control unit configured to deliver the hydraulic pressure discharged from the hydraulic pressure supply device to a wheel cylinder provided at each of wheels, wherein the reservoir includes a first reservoir chamber connected to the master cylinder and configured to supply the oil thereto, and a second reservoir chamber connected to the hydraulic pressure supply device, configured to supply the oil thereto and provided to be separated from the first reservoir chamber.

The electric brake system may further include a simulating device configured to provide a reaction force according to the pedal effort of the brake pedal, and provided with a simulation chamber connected to the master cylinder by a simulation flow path and configured to store the oil, wherein the first reservoir chamber may be connected to the simulation device to supply the oil thereto.

The reservoir may include the first reservoir chamber connected to the first master chamber and configured to supply the oil thereto, the second reservoir chamber connected to the hydraulic pressure supply device and configured supply the oil thereto, and a third reservoir chamber connected to the second master chamber and configured supply the oil thereto, and the first to third reservoir chambers may be separately provided.

The hydraulic pressure supply device may generate a hydraulic pressure using a piston operated by an electrical signal output in response to displacement of the brake pedal, and include a first pressure chamber provided at one side of the piston, which is movably accommodated inside a cylinder block, and connected to one or more wheel cylinders, and a second pressure chamber provided at the other side of the piston and connected to one or more of the wheel cylinders, and the first and second pressure chambers may be connected to the second reservoir chamber.

The electric brake system may further include a first hydraulic flow path communicating with the first pressure chamber; a second hydraulic flow path branching from the first hydraulic flow path; a third hydraulic flow path branching from the first hydraulic flow path; a fourth hydraulic flow path communicating with the second pressure chamber; a fifth hydraulic flow path branching from the fourth hydraulic flow path and connected to the second hydraulic flow path; a sixth hydraulic flow path branching from the fourth hydraulic flow path and connected to the third hydraulic flow path; a first hydraulic pressure circuit including first and second branching flow paths which each branch from the second hydraulic flow path and are connected to two wheel cylinders; and a second hydraulic pressure circuit including third and fourth branching flow paths which each branch from the third hydraulic flow path and are connected to two wheel cylinders.

The reservoir may include the first reservoir chamber connected to the first master chamber and configured to supply the oil thereto, the second reservoir chamber connected to the hydraulic pressure supply device and configured supply the oil thereto, a third reservoir chamber connected to the second master chamber and configured supply the oil thereto, wherein the first to third reservoir chambers may be separately provided, the first and second branching flow paths may be connected to the first reservoir chamber, and the third and fourth branching flow paths may be connected to the third reservoir chamber.

The electric brake system may further include a first control valve provided at the second hydraulic flow path and configured to control an oil flow therein; a second control valve provided at the third hydraulic flow path and configured to control an oil flow therein; and a third control valve provided at the fifth hydraulic flow path and configured to control an oil flow therein.

The first and second control valves may each be provided with a check valve configured to allow oil to flow in a direction from the hydraulic pressure supply device to the wheel cylinders and block oil from flowing in a reverse direction, and the third control valve may be provided with a solenoid valve configured to control a bidirectional oil flow between the hydraulic pressure supply device and the wheel cylinders.

The electric brake system may further include a first dump flow path communicating with the first pressure chamber and connected to the second reservoir chamber; a second dump flow path communicating with the second pressure chamber and connected to the second reservoir chamber; a first dump valve provided with a check valve which is provided at the first dump flow path, is configured to control the oil flow therein, and allows the oil to flow in the direction from the second reservoir chamber to the first pressure chamber, and blocks the oil from flowing in the opposite direction; a second dump valve provided with a check valve which is provided at the second dump flow path, is configured to control the oil flow therein, and allows the oil to flow in the direction from the second reservoir chamber to the second pressure chamber, and blocks the oil from flowing in the opposite direction; and a third dump valve provided at a bypass flow path connecting an upstream side of the second dump valve to a downstream side thereof at the second dump flow path, and provided with a solenoid valve configured to bidirectionally control an oil flow between the reservoir and the second pressure chamber.

The electric brake system may further include a simulation device coupled to the master cylinder and configured to provide a reaction force according to the pedal effort of the brake pedal; a first backup flow path connecting the first master chamber and the first hydraulic pressure circuit and connected to the second hydraulic flow path; a second backup flow path connecting the second master chamber and the second hydraulic pressure circuit and connected to the third hydraulic flow path; a first cut valve provided at the first backup flow path and configured to control the oil flow therein; a second cut valve provided at the first backup flow path and configured to control the oil flow therein; an electronic control unit (ECU) configured to control the valves on the basis of hydraulic pressure information and displacement information of the brake pedal; and a backup flow path pressure sensor installed between the second master chamber of the master cylinder and the second cut valve, wherein the simulation device may further include a simulator valve configured to open and close a flow path connecting a rear end of the simulation chamber and the reservoir, and the ECU may operate the hydraulic pressure supply device in a state in which the simulator valve and the second cut valve are closed to generate a pressure in the first master chamber, and, when a measured value of the backup flow path pressure sensor is less than an expected value, the ECU may determine that a leak occurs at the simulator valve.

The electric brake system may further include a check valve provided at a first reservoir flow path connecting the first reservoir chamber and the first master chamber and configured to allow a fluid to flow only in a direction from the first reservoir chamber to the first master chamber; and an inspection valve installed at a bypass flow path connecting front and rear sides of the check valve on the first reservoir flow path, wherein the ECU may control the inspection valve to be in a closed state before operating the hydraulic pressure supply device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
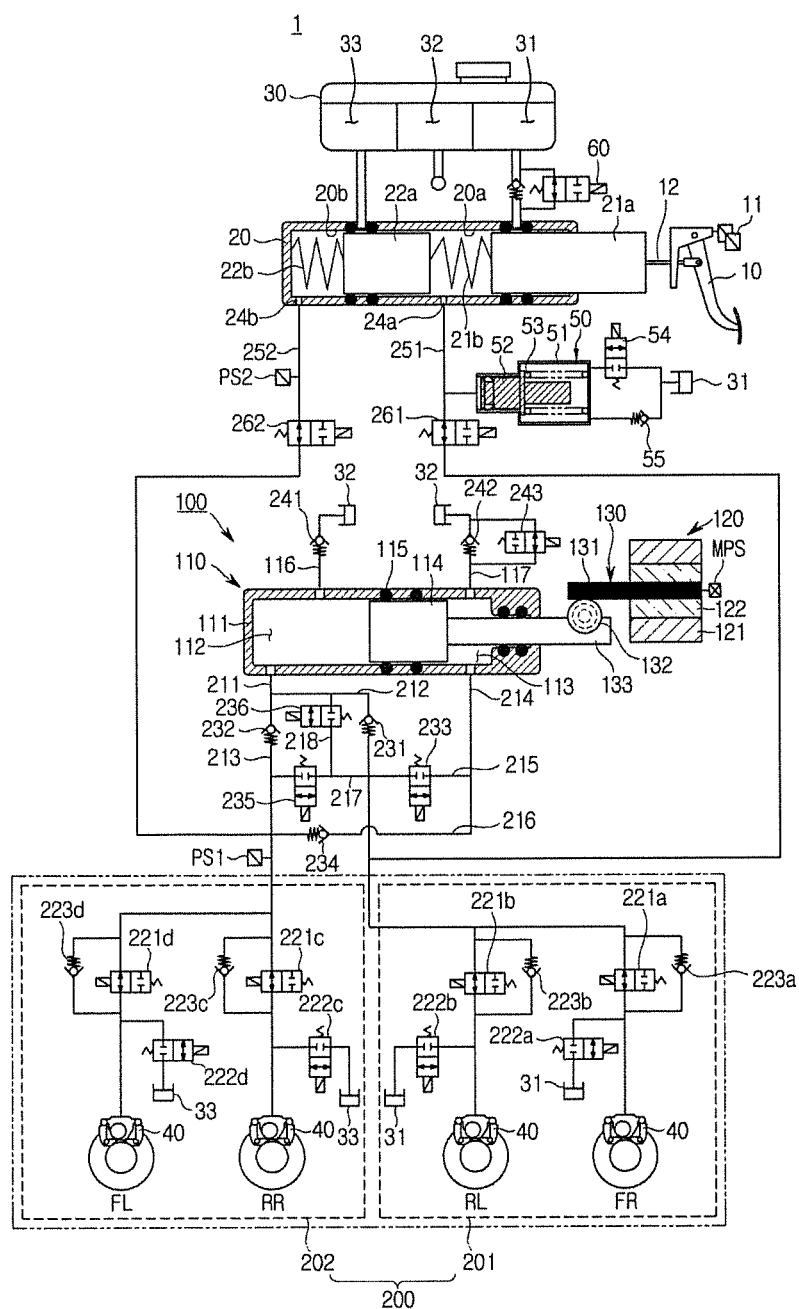
FIG. 1 is a hydraulic pressure circuit diagram illustrating a non-braking state of an electric brake system according to an embodiment of the present disclosure.

Hereinafter, embodiments of the present disclosure will be described in detail with reference to the accompanying drawings. The embodiments, which will be described below, are provided to fully convey the spirit of the present disclosure to those skilled in the art. The present disclosure is not limited to the embodiments disclosed herein, and may be implemented in other forms. In the drawings, some portions not related to the description will be omitted and not shown to clearly describe the present disclosure, and also a size of a component may be somewhat exaggerated to facilitate understanding.

FIG. 1 is a hydraulic pressure circuit diagram illustrating a non-braking state of an electric brake system 1 according to an embodiment of the present disclosure.

Referring to FIG. 1, the electric brake system 1 is generally configured with a master cylinder 20 configured to generate a hydraulic pressure, a reservoir 30 coupled to an upper part of the master cylinder 20 to store oil, an input rod 12 configured to pressurize the master cylinder 20 according to pedal effort of a brake pedal 10, a wheel cylinder 40 configured to receive the hydraulic pressure and perform braking of wheels RR, RL, FR, and FL, a pedal displacement sensor 11 configured to sense displacement of the brake pedal 10, and a simulation device 50 configured to provide a reaction force according to the pedal effort of the brake pedal 10.

The master cylinder 20 may be configured to include at least one chamber to generate a hydraulic pressure. As one example, the master cylinder 20 may be provided with a first master chamber 20a and a second master chamber 20b.

Figure 2:
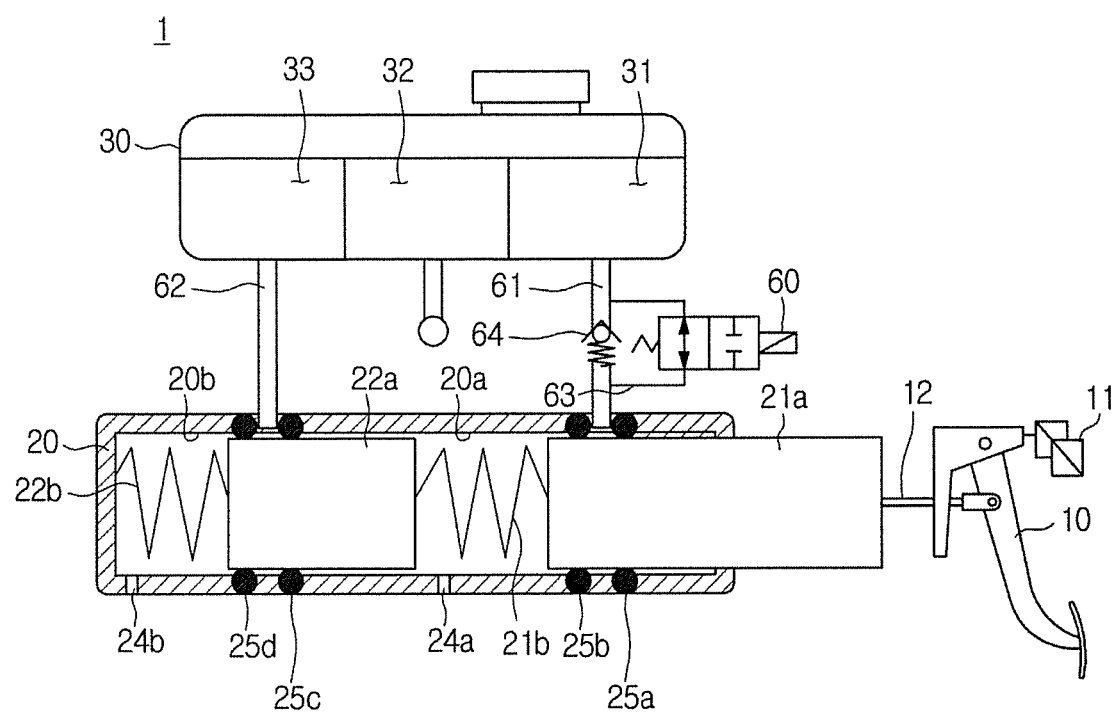
FIG. 2 is an enlarged diagram illustrating a master cylinder according to the embodiment of the present disclosure.

Next, the master cylinder 20 according to the embodiment of the present disclosure will be described with reference to FIG. 2. FIG. 2 is an enlarged diagram illustrating the master cylinder 20 according to the embodiment of the present disclosure.

A first piston 21a connected to the input rod 12 is provided at the first master chamber 20a, and a second piston 22a is provided at the second master chamber 20b. Further, the first master chamber 20a communicates with a first hydraulic pressure port 24a to allow oil to flow into and out of the first master chamber 20a, and the second master chamber 20b communicates with a second hydraulic pressure port 24b to allow the oil to flow into and out of the second master chamber 20b. As one example, the first hydraulic pressure port 24a may be connected to a first backup flow path 251, and the second hydraulic pressure port 24b may be connected to a second backup flow path 252.

Meanwhile, the master cylinder 20 may include the two master chambers 20a and 20b to secure safety when one chamber fails. For example, the first master chamber 20a of the two master chambers 20a and 20b may be connected to a front right wheel FR and a rear left wheel RL of a vehicle through the first backup flow path 251, and the second master chamber 20b thereof may be connected to a front left wheel FL and a rear right wheel RR through the second backup flow path 252. As described above, the two master chambers 20a and 20b may be independently configured so that braking of the vehicle may be possible even when one of the two master chambers 20a and 20b fails.

Also, unlike the drawings, one of the two master chambers 20a and 20b may be connected to the two front wheels FR and FL and the remaining master chamber may be connected to the two rear wheels RR and RL. In addition to the above description, one of the two master chambers 20a and 20b may be connected to the front left wheel FL and the rear left wheel RL, and the remaining master chamber may be connected to the rear right wheel RR and the front right wheel FR. That is, a variety of connection configurations may be established between the chambers of the master cylinder 20 and the wheels.

Also, a first spring 21b may be provided between the first piston 21a and the second piston 22a of the master cylinder 20, and a second spring 22b may be provided between the second piston 22a and a distal end of the master cylinder 20. That is, the first piston 21a may be accommodated in the first master chamber 20a, and the second piston 22a may be accommodated in the second master chamber 20b.

The first spring 21b and the second spring 22b are compressed by the first piston 21a and the second piston 22a which are moved according to a variation of displacement of the brake pedal 10, thereby storing an elastic force. Further, when a force pushing the first piston 21a is less than the elastic force, the first spring 21b and the second spring 22b may use the stored elastic force to push the first and second pistons 21a and 22a and return the first and second pistons 21a and 22a to their original positions.

Meanwhile, the input rod 12 configured to pressurize the first piston 21a of the master cylinder 20 may be in close contact with the first piston 21a. That is, there may be no gap between the master cylinder 20 and the input rod 12. Consequently, when the brake pedal 10 is stepped on, the master cylinder 20 may be directly pressurized without a pedal dead stroke section.

Also, the first master chamber 20a may be connected to the reservoir 30 through a first reservoir flow path 61, and the second master chamber 20b may be connected to the reservoir 30 through a second reservoir flow path 62.

Also, the master cylinder 20 may include two sealing members 25a and 25b which are disposed in front of and behind the first reservoir flow path 61, and two sealing members 25c and 25d which are disposed in front of and behind the second reservoir flow path 62. Each of the sealing members 25a, 25b, 25c, and 25d may have a ring shape that protrudes to an inner wall of the master cylinder 20 or an outer circumferential surface of each of the pistons 21a and 22a.

Also, a check valve 64 may be provided at the first reservoir flow path 61 to enable oil to flow into the first master chamber 20a from the reservoir 30 and block oil from flowing into the reservoir 30 from the first master chamber 20a. The check valve 64 may be provided to enable fluid to flow in one direction.

Further, a front side and a rear side of the check valve 64 of the first reservoir flow path 61 may be connected through a bypass flow path 63. Also, an inspection valve 60 may be provided at the bypass flow path 63.

The inspection valve 60 may be provided with a bidirectional control valve which controls an oil flow between the reservoir 30 and the master cylinder 20. Further, the inspection valve 60 may be configured with a normally open type solenoid valve that is usually open and is closed when a closing signal is received from an electronic control unit (ECU).

A detailed function and an operating process of the inspection valve 60 will be described below.

The simulation device 50 may be connected to a first backup flow path 251, which will be described below, to provide a reaction force according to pedal effort of the brake pedal 10. The reaction force may be provided to compensate for pedal effort provided from a driver such that a braking force may be finely controlled as intended by the driver.

Referring to FIG. 1, the simulation device 50 includes a simulation chamber 51 provided to store oil flowing from the first hydraulic pressure port 24a of the master cylinder 20, a reaction force piston 52 provided inside the simulation chamber 51, a pedal simulator provided with a reaction force spring 53 that is configured to elastically support the reaction force piston 52, and a simulator valve 54 connected to a rear end part of the simulation chamber 51.

The reaction force piston 52 and the reaction force spring 53 are each installed to have a predetermined range of displacement within the simulation chamber 51 by oil flowing therein.

Meanwhile, the reaction force spring 53 shown in the drawing is merely one embodiment capable of providing an elastic force to the reaction force piston 52, and thus it may include numerous embodiments capable of storing the elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting the rear end part of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, even when the reaction force piston 52 returns to its original position, oil in the reservoir 30 may flow into the simulation chamber 51 through the simulator valve 54 so that an inside of the simulation chamber 51 is entirely filled with the oil.

Meanwhile, the simulator valve 54 may be configured with a normally closed type solenoid valve that is usually maintained in a closed state. When the driver applies pedal effort to the brake pedal 10, the simulator valve 54 may be opened to deliver the oil in the simulation chamber 51 to the reservoir 30.

Also, a simulator check valve 55 may be installed between the pedal simulator and the reservoir 30 to be connected thereto in parallel with the simulator valve 54. The simulator check valve 55 may allow the oil in the reservoir 30 to flow toward the simulation chamber 51 and may block a flow of the oil in the simulation chamber 51 toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of a pressure in the pedal simulator.

As a description of an operating process of the simulation device 50, when the driver applies pedal effort to the brake pedal 10, the oil in the simulation chamber 51 which is pushed by the reaction force piston 52 of the pedal simulator while the reaction force piston 52 pressurizes the reaction force spring 53 is delivered to the reservoir 30 through the simulator valve 54, and then a pedal feeling is provided to the driver through such an operating process. Further, when the driver releases the pedal effort from the brake pedal 10, the reaction force spring 53 may push the reaction force piston 52 to return the reaction force piston 52 to an original state thereof, and the oil in the reservoir 30 may flow inside the simulation chamber 51 through the flow path at which the simulator valve 54 is installed and the flow path at which the simulator check valve 55 is installed, thereby completely filling the inside of the simulation chamber 51 with the oil.

As described above, since the inside of the simulation chamber 51 is in a state in which the oil is always filled therein, friction of the reaction force piston 52 is minimized when the simulation device 50 operates, and thus durability of the simulation device 50 may be improved and introduction of foreign materials from the outside may also be blocked.

The electric brake system 1 according to the embodiment of the present disclosure may include the hydraulic pressure supply device 100 configured to operate mechanically and receive a braking intent of a driver in the form of an electrical signal from the pedal displacement sensor 11 sensing displacement of the brake pedal 10; a hydraulic pressure control unit 200 configured with first and second hydraulic pressure circuits 201 and 202, which are configured to control delivery of a hydraulic pressure provided to the wheel cylinders 40 provided at the wheels RR, RL, FR, and FL; a first cut valve 261 provided at the first backup flow path 251 connecting the first hydraulic pressure port 24a to the first hydraulic pressure circuit 201 and configured to control a delivery of the hydraulic pressure; a second cut valve 262 provided at a second backup flow path 252 connecting the second hydraulic pressure port 24b to the second hydraulic pressure circuit 202 and configured to control the delivery of the hydraulic pressure; and an ECU (not shown) configured to control the hydraulic pressure supply device 100 and valves 54, 60, 221a, 221b, 221c, 221d, 222a, 222b, 222c, 222d, 233, 235, 236, and 243 on the basis of hydraulic pressure information and pedal displacement information.

The hydraulic pressure supply device 100 may include a hydraulic pressure supply unit 110 configured to provide an oil pressure delivered to the wheel cylinders 40, a motor 120 configured to generate a rotational force in response to an electrical signal from the pedal displacement sensor 11, and a power converter 130 configured to convert a rotational movement of the motor 120 into a rectilinear movement and transmit the rectilinear movement to the hydraulic pressure supply unit 110. Alternatively, the hydraulic pressure supply unit 110 may be operated by a pressure provided from a high-pressure accumulator instead of a driving force supplied from the motor 120.

Figure 3:
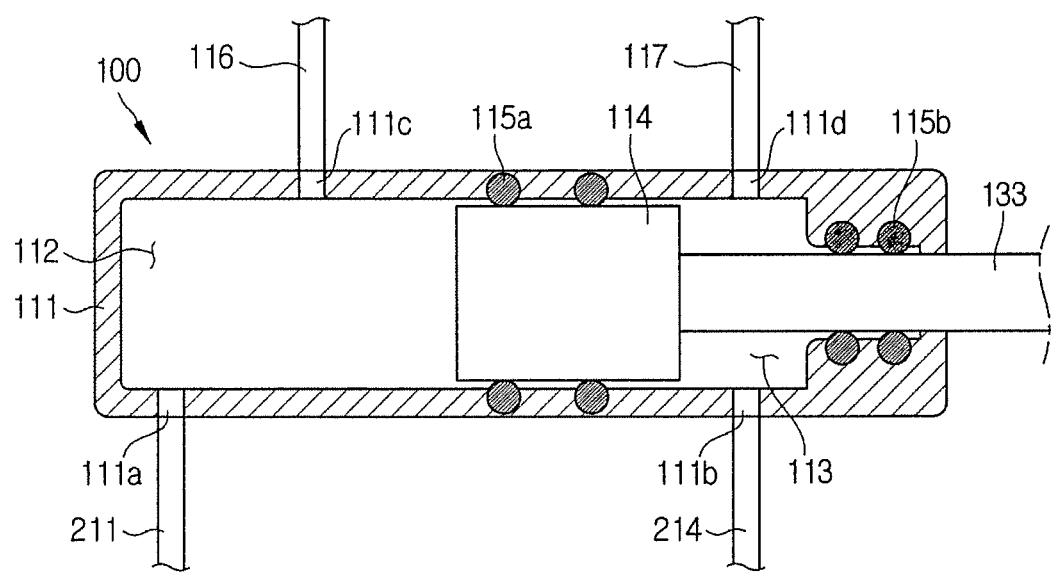
FIG. 3 is an enlarged diagram of a hydraulic pressure supply unit according to the embodiment of the present disclosure.

Next, the hydraulic pressure supply unit 110 according to the embodiment of the present disclosure will be described with reference to FIG. 3. FIG. 3 is an enlarged diagram of the hydraulic pressure supply unit 110 according to the embodiment of the present disclosure.

The hydraulic pressure supply unit 110 includes a cylinder block 111 in which a pressure chamber configured to receive and store oil is formed, a hydraulic piston 114 accommodated inside the cylinder block 111, sealing members 115 (that is, 115a and 115b) provided between the hydraulic piston 114 and the cylinder block 111 and configured to seal the pressure chamber, and a drive shaft 133 connected to a rear end part of the hydraulic piston 114 and configured to transmit power, which is output from the power converter 130, to the hydraulic piston 114.

The pressure chamber may include a first pressure chamber 112 located at a front side (in a forward movement direction, that is, a left direction in the drawing) of the hydraulic piston 114, and a second pressure chamber 113 located at a rear side (in a backward movement direction, that is, a right direction in the drawing) of the hydraulic piston 114. That is, the first pressure chamber 112 is comparted by the cylinder block 111 and a front end of the hydraulic piston 114 and is provided to have a volume that varies according to a movement of the hydraulic piston 114, and the second pressure chamber 113 is comparted by the cylinder block 111 and a rear end of the hydraulic piston 114 and is provided to have a volume that varies according to the movement of the hydraulic piston 114.

The first pressure chamber 112 is connected to a first hydraulic flow path 211 through a first communicating hole 111a formed at a rear side of the cylinder block 111, and is connected to a fourth hydraulic flow path 214 through a second communicating hole 111b formed at a front side of the cylinder block 111. The first hydraulic flow path 211 connects the first pressure chamber 112 to the first and second hydraulic pressure circuits 201 and 202. Further, the first hydraulic flow path 211 branches into a second hydraulic flow path 212 communicating with the first hydraulic pressure circuit 201, and a third hydraulic flow path 213 communicating with the second hydraulic pressure circuit 202. The fourth hydraulic flow path 214 connects the second pressure chamber 113 to the first and second hydraulic pressure circuits 201 and 202. Further, the fourth hydraulic flow path 214 branches into a fifth hydraulic flow path 215 communicating with the first hydraulic pressure circuit 201, and a sixth hydraulic flow path 216 communicating with the second hydraulic pressure circuit 202.

The sealing member 115 includes a piston sealing member 115a provided between the hydraulic piston 114 and the cylinder block 111 to seal between the first pressure chamber 112 and the second pressure chamber 113, and a drive shaft sealing member 115*b* provided between the drive shaft 133 and the cylinder block 111 to seal an opening between the second pressure chamber 113 and the cylinder block 111. That is, a hydraulic pressure or a negative pressure of the first pressure chamber 112 which is generated while the hydraulic piston 114 is moved forward or backward may be blocked by the piston sealing member 115*a* and may be delivered to the first and fourth hydraulic flow paths 211 and 214 without leaking into the second pressure chamber 113. Further, a hydraulic pressure or a negative pressure of the second pressure chamber 113 which is generated while the hydraulic piston 114 is moved forward or backward may be blocked by the drive shaft sealing member 115*b* and may not leak into the cylinder block 111.

The first and second pressure chambers 112 and 113 may be respectively connected to the reservoir 30 by dump flow paths 116 and 117, and may receive and store oil supplied from the reservoir 30 or deliver oil in the first or second pressure chamber 112 or 113 to the reservoir 30. As one example, the dump flow paths 116 and 117 may include a first dump flow path 116 branching from the first pressure chamber 112 and connected to the reservoir 30, and a second dump flow path 117 branching from the second pressure chamber 113 and connected to the reservoir 30.

Also, the first pressure chamber 112 may be connected to the first dump flow path 116 through a fifth communicating hole 111*f* formed at a front side of the first pressure chamber 112, and the second pressure chamber 113 may be connected to the second dump flow path 117 through a sixth communicating hole 111*e* formed at a rear side of the second pressure chamber 113.

Further, the first communicating hole 111*a* communicating with the first hydraulic flow path 211 may be formed at a front side of the first pressure chamber 112, and the second communicating hole 111*b* communicating with the fourth hydraulic flow path 214 may be formed at a rear side of the first pressure chamber 112. Also, a third communicating hole 111*c* communicating with the first dump flow path 116 may be further formed at the first pressure chamber 112.

Further, the second communicating hole 111*b* communicating with the fourth hydraulic flow path 214, and a fourth communicating hole 111*d* communicating with the second dump flow path 117 may be formed at the second pressure chamber 113.

Referring back to FIG. 1, flow paths 211, 212, 213, 214, 215, 216, and 217 and valves 231, 232, 233, 234, 235, 236, 241, 242, and 243, which are connected to the first pressure chamber 112 and the second pressure chamber 113, will be described.

The second hydraulic flow path 212 may communicate with the first hydraulic pressure circuit 201, and the third hydraulic flow path 213 may communicate with the second hydraulic pressure circuit 202. Therefore, a hydraulic pressure may be delivered to the first hydraulic pressure circuit 201 and the second hydraulic pressure circuit 202 while the hydraulic piston 114 is moved forward.

Also, the electric brake system 1 according to the embodiment of the present disclosure may include a first control valve 231 and a second control valve 232 which are respectively provided at the second and third hydraulic flow paths 212 and 213 and are configured to control an oil flow therein.

Further, each of the first and second control valves 231 and 232 may be configured with check valves which allow oil to flow only in a direction from the first pressure chamber 112 toward the first or second hydraulic pressure circuit 201 or 202 and block a flow of the oil in a reverse direction. That is, the first or second control valve 231 or 232 may allow the hydraulic pressure of the first pressure chamber 112 to be delivered to the first or second hydraulic pressure circuit 201 or 202, and prevent a leak of a hydraulic pressure of the first or second hydraulic pressure circuit 201 and 202 into the first pressure chamber 112 through the second or third hydraulic flow path 212 or 213.

Meanwhile, a fourth hydraulic flow path 214 may branch into a fifth hydraulic flow path 215 and a sixth hydraulic flow path 216 at the middle of the fourth hydraulic flow path 214, thereby communicating with both the first hydraulic pressure circuit 201 and the second hydraulic pressure circuit 202. As one example, the fifth hydraulic flow path 215 branching from the fourth hydraulic flow path 214 may communicate with the first hydraulic pressure circuit 201, and the sixth hydraulic flow path 216 branching from the fourth hydraulic flow path 214 may communicate with the second hydraulic pressure circuit 202. Accordingly, the hydraulic pressure may be delivered to both the first hydraulic pressure circuit 201 and the second hydraulic pressure circuit 202 while the hydraulic piston 114 is moved backward.

Also, the electric brake system 1 according to the embodiment of the present disclosure may include a third control valve 233 provided at the fifth hydraulic flow path 215 and configured to control an oil flow therein, and a fourth control valve 234 provided at the sixth hydraulic flow path 216 and configured to control an oil flow therein.

The third control valve 233 may be configured with a bidirectional control valve which controls an oil flow between the second pressure chamber 113 and the first hydraulic pressure circuit 201. Further, the third control valve 233 may be configured with a normally closed type solenoid valve that is usually closed and is opened when an opening signal is received from the ECU.

Also, the fourth control valve 234 may be configured with a check valve which allows oil to flow only in a direction from the second pressure chamber 113 toward the second hydraulic pressure circuit 202 and blocks a flow of oil in a reverse direction. That is, the fourth control valve 234 may prevent a leak of the hydraulic pressure of the second hydraulic pressure circuit 202 into the second pressure chamber 113 through the sixth hydraulic flow path 216 and the fourth hydraulic flow path 214.

Also, the electric brake system 1 according to the embodiment of the present disclosure may include a fifth control valve 235 provided at a seventh hydraulic flow path 217 connecting the second hydraulic flow path 212 to the third hydraulic flow path 213 and configured to control an oil flow therein, and a sixth control valve 236 provided at an eighth hydraulic flow path 218 connecting the second hydraulic flow path 212 to the seventh hydraulic flow path 217 and configured to control an oil flow therein. Further, the fifth control valve 235 and the sixth control valve 236 may be configured with normally closed type solenoid valves that are usually closed and are opened when the opening signal is received from the ECU.

Each of the fifth control valve 235 and the sixth control valve 236 may be operated to be opened when the first control valve 231 or the second control valve 232 is operated abnormally, thereby allowing the hydraulic pressure of the first pressure chamber 112 to be delivered to both the first hydraulic pressure circuit 201 and the second hydraulic pressure circuit 202.

Further, each of the fifth control valve 235 and the sixth control valve 236 may be operated to be opened when a hydraulic pressure of each of the wheel cylinders 40 is discharged and then delivered to the first pressure chamber 112. This is because the first control valve 231 and the second control valve 232 respectively provided at the second hydraulic flow path 212 and the third hydraulic flow path 213 are configured with check valves allowing oil to flow in one direction.

Also, the electric brake system 1 according to the embodiment of the present disclosure may further include a first dump valve 241 and a second dump valve 242 which are respectively provided at the first and second dump flow paths 116 and 117 and configured to control an oil flow therein. The dump valves 241 and 242 may be check valves that are opened in a direction from the reservoir 30 to the first and second pressure chambers 112 and 113 and blocks a flow in a reverse direction thereof. That is, the first dump valve 241 may be a check valve that allows oil to flow from the reservoir 30 to the first pressure chamber 112 and blocks a flow of the oil from the first pressure chamber 112 to the reservoir 30, and the second dump valve 242 may be a check valve that allows oil to flow from the reservoir 30 to the second pressure chamber 113 and blocks a flow of the oil from the second pressure chamber 113 to the reservoir 30.

Also, the second dump flow path 117 may include a bypass flow path, and a third dump valve 243 may be installed at the bypass flow path to control an oil flow between the second pressure chamber 113 and the reservoir 30.

The third dump valve 243 may be configured with a solenoid valve capable of bidirectionally controlling an oil flow, and with a normally open type solenoid valve that is usually open and is closed when the closing signal is received from the ECU.

The hydraulic pressure supply unit 110 of the electric brake system 1 according to the embodiment of the present disclosure may operate with double action. That is, a hydraulic pressure which is generated in the first pressure chamber 112 while the hydraulic piston 114 is moved forward may be delivered to the first hydraulic pressure circuit 201 through the first hydraulic flow path 211 and the second hydraulic flow path 212 to operate the wheel cylinders 40 installed at the front right wheel FR and the rear left wheel RL, and may be delivered to the second hydraulic pressure circuit 202 through the first hydraulic flow path 211 and the third hydraulic flow path 213 to operate the wheel cylinders 40 installed at the rear right wheel RR and the front left wheel FL.

Similarly, a hydraulic pressure which is generated in the second pressure chamber 113 while the hydraulic piston 114 is moved backward may be delivered to the first hydraulic pressure circuit 201 through the fourth hydraulic flow path 214 and the fifth hydraulic flow path 215 to operate the wheel cylinders 40 installed at the front right wheel FR and the rear left wheel RL, and may be delivered to the second hydraulic pressure circuit 202 through the fourth hydraulic flow path 214 and the sixth hydraulic flow path 216 to operate the wheel cylinders 40 installed at the rear right wheel RR and the front left wheel FL.

Also, a negative pressure which is generated in the first pressure chamber 112 while the hydraulic piston 114 is moved backward may cause oil in the wheel cylinders 40 installed at the front right wheel FR and the rear left wheel RL to be suctioned and delivered to the first pressure chamber 112 through the first hydraulic pressure circuit 201, the second hydraulic flow path 212, and the first hydraulic flow path 211, and may cause oil in the wheel cylinders 40 installed at the rear right wheel RR and the front left wheel FL to be suctioned and delivered to the first pressure chamber 112 through the second hydraulic pressure circuit 202, the third hydraulic flow path 213, and the first hydraulic flow path 211.

Next, the motor 120 and the power converter 130 of the hydraulic pressure supply device 100 will be described.

The motor 120 is a device configured to generate a rotational force according to a signal output from the ECU (not shown), and may generate the rotational force in a forward or backward direction. An angular velocity and a rotational angle of the motor 120 may be precisely controlled. Since such a motor 120 is generally known in the related art, a detailed description thereof will be omitted.

Meanwhile, the ECU controls not only the motor 120 but also the valves 54, 60, 221a, 221b, 221c, 221d, 222a, 222b, 222c, 222d, 233, 235, 236, and 243 provided at the electric brake system 1 of the present disclosure, which will be described below. An operation of controlling a plurality of valves according to displacement of the brake pedal 10 will be described below.

A driving force of the motor 120 generates displacement of the hydraulic piston 114 through the power converter 130, and a hydraulic pressure which is generated while the hydraulic piston 114 slides inside the pressure chamber is delivered to the wheel cylinder 40 installed at each of the wheels RR, RL, FR, and FL through the first and second hydraulic flow paths 211 and 212.

The power converter 130 is a device configured to convert a rotational force into a rectilinear movement, and, as one example, may be configured with a worm shaft 131, a worm wheel 132, and the drive shaft 133.

The worm shaft 131 may be integrally formed with a rotational shaft of the motor 120 and rotates the worm wheel 132 by being engaged therewith and coupled thereto through a worm formed on an outer circumferential surface of the worm shaft 131. The worm wheel 132 linearly moves the drive shaft 133 by being engaged therewith and coupled thereto, and the drive shaft 133 is connected to the hydraulic piston 114 to slide the hydraulic piston 114 inside the cylinder block 111.

To describe such operations again, a signal which is sensed by the pedal displacement sensor 11 when displacement occurs at the brake pedal 10 is transmitted to the ECU (not shown), and then the ECU drives the motor 120 in one direction to rotate the worm shaft 131 in the one direction. A rotational force of the worm shaft 131 is transmitted to the drive shaft 133 via the worm wheel 132, and then the hydraulic piston 114 connected to the drive shaft 133 is moved forward to generate a hydraulic pressure in the first pressure chamber 112.

Conversely, when pedal effort is released from the brake pedal 10, the ECU drives the motor 120 in a reverse direction, and thus the worm shaft 131 is reversely rotated. Consequently, the worm wheel 132 is also reversely rotated, and thus a negative pressure is generated in the first pressure chamber 112 while the hydraulic piston 114 connected to the drive shaft 133 is returned to its original position, that is, moved backward.

Meanwhile, it is possible for the generation of the hydraulic pressure and the negative pressure to be opposite that which is described above. That is, the signal which is sensed by the pedal displacement sensor 11 when the displacement occurs at the brake pedal 10 is transmitted to the ECU (not shown), and then the ECU drives the motor 120 in the reverse direction to rotate the worm shaft 131 in the reverse direction. The rotational force of the worm shaft 131 is transmitted to the drive shaft 133 via the worm wheel 132, and then the hydraulic piston 114 connected to the drive shaft 133 is moved backward to generate a hydraulic pressure in the second pressure chamber 113.

Conversely, when pedal effort is released from the brake pedal 10, the ECU drives the motor 120 in one direction, and thus the worm shaft 131 is rotated in the one direction. Consequently, the worm wheel 132 is also reversely rotated, and thus a negative pressure is generated in the second pressure chamber 113 while the hydraulic piston 114 connected to the drive shaft 133 is returned to its original position, that is, moved forward.

As described above, the hydraulic pressure supply device 100 serves to deliver the hydraulic pressure to the wheel cylinders 40 or to suction and deliver the hydraulic pressure to the reservoir 30 according to a rotational direction of the rotational force generated by the motor 120.

Meanwhile, when the motor 120 is rotated in the one direction, the hydraulic pressure may be generated in the first pressure chamber 112 or the negative pressure may be generated in the second pressure chamber 113, and whether the hydraulic pressure is used for braking or the negative pressure is used for releasing the braking may be determined through the control of the valves 54, 60, 221a, 221b, 221c, 221d, 222a, 222b, 222c, 222d, 233, 235, 236, and 243. This will be described in detail below.

Although not shown in the drawing, the power converter 130 may be configured with a ball screw nut assembly. For example, the power converter 130 may be configured with a screw which is integrally formed with the rotational shaft of the motor 120 or is connected to and rotated with the rotational shaft thereof, and a ball nut which is screw-coupled to the screw in a state in which a rotation of the ball nut is restricted to perform a rectilinear movement according to the rotation of the screw. The hydraulic piston 114 is connected to the ball nut of the power converter 130 to pressurize the pressure chamber by the rectilinear movement of the ball nut. Such a ball screw nut assembly is a device configured to convert a rotational movement into a rectilinear movement, and since a structure thereof is generally known in the related art, a detailed description thereof will be omitted.

Further, it should be understood that the power converter 130 according to the embodiment of the present disclosure may employ any structure capable of converting a rotational movement into a rectilinear movement in addition to the structure of the ball screw nut assembly.

Also, the electric brake system 1 according to the embodiment of the present disclosure may further include the first and second backup flow paths 251 and 252 capable of directly supplying oil discharged from the master cylinder 20 to the wheel cylinders 40 when the hydraulic pressure supply device 100 operates abnormally.

The first cut valve 261 configured to control an oil flow therethrough may be provided at the first backup flow path 251, and the second cut valve 262 configured to control an oil flow therethrough may be provided at the second backup flow path 252. Also, the first backup flow path 251 may connect the first hydraulic pressure port 24a and the first hydraulic pressure circuit 201, and the second backup flow path 252 may connect the second hydraulic pressure port 24b and the second hydraulic pressure circuit 202.

Further, the first and second cut valves 261 and 262 may be configured with normally open type solenoid valves that are usually open and are closed when the closing signal is received from the ECU.

Next, the hydraulic pressure control unit 200 according to the embodiment of the present disclosure will be described.

The hydraulic pressure control unit 200 may be configured with the first hydraulic pressure circuit 201 and the second hydraulic pressure circuit 202, which each receive a hydraulic pressure and control two wheels. As one example, the first hydraulic pressure circuit 201 may control the front right wheel FR and the rear left wheel RL, and the second hydraulic pressure circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic pressure circuit 201 is connected to the first hydraulic flow path 211 and the second hydraulic flow path 212 to receive a hydraulic pressure supplied from the hydraulic pressure supply device 100, and the second hydraulic flow path 212 branches into two flow paths which are respectively connected to the front right wheel FR and the rear left wheel RL. Similarly, the second hydraulic pressure circuit 202 is connected to the first hydraulic flow path 211 and the third hydraulic flow path 213 to receive the hydraulic pressure supplied from the hydraulic pressure supply device 100, and the third hydraulic flow path 213 branches into two flow paths which are respectively connected to the front left wheel FL and the rear right wheel RR.

The hydraulic pressure circuits 201 and 202 may be provided with a plurality of inlet valves 221 (that is, 221a, 221b, 221c, and 221d) to control the delivery of the hydraulic pressure. As one example, two of the inlet valves 221a and 221b may be provided at the first hydraulic pressure circuit 201 and connected to the first hydraulic flow path 211 to respectively control the hydraulic pressure delivered to two of the wheel cylinders 40. Also, two of the inlet valves 221c and 221d may be provided at the second hydraulic pressure circuit 202 and connected to the second hydraulic flow path 212 to respectively control the hydraulic pressure delivered to two of the wheel cylinders 40.

Further, the plurality of inlet valves 221 may be disposed at an upstream side of each of the wheel cylinders 40 and may be configured with normally open type solenoid valves that are usually open and are closed when the closing signal is received from the ECU.

Also, the hydraulic pressure circuits 201 and 202 may include check valves 223a, 223b, 223c, and 223d which are provided at respective bypass flow paths connecting front sides to rear sides of the inlet valves 221a, 221b, 221c, and 221d. Each of the check valves 223a, 223b, 223c, and 223d may be provided to allow oil to flow only in a direction from the wheel cylinder 40 to the hydraulic pressure supply unit 110 and block a flow of oil in a direction from the hydraulic pressure supply unit 110 to the wheel cylinder 40. Each of the check valves 223a, 223b, 223c, and 223d may be operated to rapidly discharge a braking pressure from the wheel cylinder 40 and allow the hydraulic pressure of the wheel cylinder 40 to be delivered to the hydraulic pressure supply unit 110 when the inlet valves 221a, 221b, 221c, and 221d are operated abnormally.

Also, the hydraulic pressure circuits 201 and 202 may be further provided with a plurality of outlet valves 222 (that is, 222a, 222b, 222c, and 222d) connected to the reservoir 30 to improve brake release performance when braking is released. Each of the outlet valves 222 is connected to the wheel cylinder 40 to control discharging of the hydraulic pressure from each of the wheels RR, RL, FR, and FL. That is, when a braking pressure of each of the wheels RR, RL, FR, and FL is measured and a decompression of the braking is determined as being required, the outlet valves 222 may be selectively opened to control the braking pressure.

Further, the outlet valves 222 may be configured with normally closed type solenoid valves that are usually closed and are opened when the opening signal is received from the ECU.

In addition, the hydraulic pressure control unit 200 may be connected to the backup flow paths 251 and 252. As one example, the first hydraulic pressure circuit 201 may be connected to the first backup flow path 251 to receive the hydraulic pressure provided from the master cylinder 20, and the second hydraulic pressure circuit 202 may be connected to the second backup flow path 252 to receive the hydraulic pressure provided from the master cylinder 20.

At this point, the first backup flow path 251 may be connected to the first hydraulic pressure circuit 201 at an upstream side of each of the first and second inlet valves 221*a* and 221*b*. Similarly, the second backup flow path 252 may be connected to the second hydraulic pressure circuit 202 at an upstream side of each of the third and fourth inlet valves 221*c* and 221*d*. Consequently, when the first and second cut valves 261 and 262 are closed, the hydraulic pressure provided from the hydraulic pressure supply device 100 may be supplied to the wheel cylinders 40 through the first and second hydraulic pressure circuits 201 and 202, and, when the first and second cut valves 261 and 262 are open, the hydraulic pressure provided from the master cylinder 20 may be supplied to the wheel cylinders 40 through the first and second backup flow paths 251 and 252. At this point, since the plurality of inlet valves 221*a*, 221*b*, 221*c*, and 221*d* are in an open state, there is no need to switch operation states thereof.

Meanwhile, an undescribed reference number "PS1" is a hydraulic flow path pressure sensor configured to sense a hydraulic pressure of the first hydraulic pressure circuit 201 and the second hydraulic pressure circuit 202, and an undescribed reference number "PS2" is a backup flow path pressure sensor configured to sense an oil pressure of the master cylinder 20. Further, an undescribed reference number "MPS" is a motor control sensor configured to control a rotational angle or a current of the motor 120.

Hereinafter, an operation of the electric brake system 1 according to the embodiment of the present disclosure will be described in detail.

The hydraulic pressure supply device 100 may separately use a low pressure mode and a high pressure mode. The low pressure mode and the high pressure mode may be changed between by changing an operation of the hydraulic pressure control unit 200. The hydraulic pressure supply device 100 may operate in the high pressure mode, thereby generating a high hydraulic pressure without increasing an output of the motor 120. Therefore, a stable braking force may be secured while reducing costs and a weight of a brake system.

To describe the operation of the electric brake system 1 in more detail, a hydraulic pressure is generated in the first pressure chamber 112 while the hydraulic piston 114 is moved forward. As the hydraulic piston 114 is moved forward in an initial stage, that is, a stroke of the hydraulic piston 114 is increased, an amount of oil delivered from the first pressure chamber 112 to the wheel cylinders 40 is increased to raise a braking pressure thereof. However, since there is an active stroke of the hydraulic piston 114, a maximum pressure due to the forward movement of the hydraulic piston 114 exists.

At this point, the maximum pressure in the low pressure mode is less than that in the high pressure mode. However, when comparing the high pressure mode with the low pressure mode, a rate of increase in pressure per stroke of the hydraulic piston 114 in the high pressure mode is less than that in the low pressure mode. The reason for that is, rather than the discharged oil totally flowing into the wheel cylinders 40, a portion of oil discharged from the first pressure chamber 112 flows into the second pressure chamber 113. This will be described in detail with reference to FIG. 4.

Therefore, the low pressure mode in which the rate of increase in pressure per stroke is large may be executed at the initial stage of braking where braking responsiveness is important, whereas the high pressure mode in which a maximum pressure is large may be executed at a post-initial stage of braking where a maximum braking force is important.

When braking is begun by a driver, an amount of braking requested by the driver may be sensed through the pedal displacement sensor 11 on the basis of information including a pressure applied to the brake pedal 10 by the driver and the like. The ECU receives an electrical signal output from the pedal displacement sensor 11 to drive the motor 120.

Also, the ECU may receive an amount of regenerative braking through the backup flow path pressure sensor PS2 provided at an outlet side of the master cylinder 20 and the hydraulic flow path pressure sensor PS1 provided at the second hydraulic pressure circuit 202, and may calculate an amount of braking friction on the basis of a difference between the amount of braking requested by the driver and the amount of regenerative braking to determine a magnitude of an increase or reduction of a pressure at the wheel cylinder 40.

When the driver steps on the brake pedal 10 at the initial stage of braking, the motor 120 operates to rotate in one direction, and a rotational force of the motor 120 is delivered to the hydraulic pressure supply unit 110 by the power converter 130, and thus the hydraulic pressure is generated in the first pressure chamber 112 while the hydraulic piston 114 of the hydraulic pressure supply unit 110 is moved forward. The hydraulic pressure discharged from the hydraulic pressure supply unit 110 is delivered to the wheel cylinder 40 provided at each of the four wheels through the first hydraulic pressure circuit 201 and the second hydraulic pressure circuit 202 to generate a braking force.

In particular, the hydraulic pressure provided from the first pressure chamber 112 is directly delivered to the wheel cylinders 40 provided at the two wheels FR and RL through the first hydraulic flow path 211 and the second hydraulic flow path 212 which are connected to the first communicating hole 111*a*. At this point, the first and second inlet valves 221*a* and 221*b*, which are respectively installed at two flow paths branching from the second hydraulic flow path 212, are provided in the open state. Also, the first and second outlet valves 222*a* and 222*b* installed at flow paths branching from the two flow paths, which branch from the second hydraulic flow path 212, are maintained in the closed state to prevent a leak of the hydraulic pressure into the reservoir 30.

Further, the hydraulic pressure provided from the first pressure chamber 112 is directly delivered to the wheel cylinders 40 provided at the two wheels RR and FL through the first hydraulic flow path 211 and the third hydraulic flow path 213 which are connected to the first communicating hole 111*a*. At this point, the third and fourth inlet valves 221*c* and 221*d*, which are respectively installed at two flow paths branching from the third hydraulic flow path 213, are provided in the open state. Also, the third and fourth outlet valves 222*c* and 222*d* installed at flow paths branching from the two flow paths, which branch from the third hydraulic flow path 213, are maintained in the closed state to prevent a leak of the hydraulic pressure into the reservoir 30.

Further, the fifth control valve 235 and the sixth control valve 236 may be switched to the open state, thereby opening the seventh hydraulic flow path 217 and the eighth hydraulic flow path 218. The seventh hydraulic flow path 217 and the eighth hydraulic flow path 218 are opened so that the second hydraulic flow path 212 and the third hydraulic flow path 213 communicate with each other. However, one or more of the fifth control valve 235 and the sixth control valve 236 may be maintained in the closed state as necessary.

Further, the third control valve 233 may be maintained in the closed state, thereby blocking the fifth hydraulic flow path 215. Delivery of the hydraulic pressure generated in the first pressure chamber 112 to the second pressure chamber 113 through the fifth hydraulic flow path 215 connected to the second hydraulic flow path 212 may be blocked such that a rate of increase in pressure per stroke may be improved. Therefore, a rapid braking response may be expected in the initial stage of braking.

In addition, when the hydraulic pressure delivered to each of the wheel cylinders 40 is measured as being higher than a target pressure value according to the pedal effort of the brake pedal 10, one or more among the first to fourth outlet valves 222 may be opened to control the hydraulic pressure to converge on the target pressure value.

Also, when the hydraulic pressure is generated in the hydraulic pressure supply device 100, the first and second cut valves 261 and 262, which are installed at the first and second backup flow paths 251 and 252 connected to the first and second hydraulic pressure ports 24a and 24b of the master cylinder 20, are closed so that the hydraulic pressure discharged from the master cylinder 20 is not delivered to the wheel cylinders 40.

Also, hydraulic pressure generated by a pressurization of the master cylinder 20 according to the pedal effort of the brake pedal 10 is delivered to the simulation device 50 connected to the master cylinder 20. At this point, the simulator valve 54, which is installed at the rear end part of the simulation chamber 51 and is a normally closed type valve, is opened so that the oil filled in the simulation chamber 51 is delivered to the reservoir 30 through the simulator valve 54. Also, the reaction force piston 52 is moved, and a pressure corresponding to a reaction force of the reaction force spring 53 supporting the reaction force piston 52 is formed inside the simulation chamber 51 so that an appropriate pedal feeling is provided to the driver.

Also, the hydraulic flow path pressure sensor PS1 installed at the second hydraulic flow path 212 may detect a flow rate delivered to the wheel cylinder 40 installed at the front right wheel FR or the rear left wheel RL (hereinafter, simply referred to as the wheel cylinder 40). Therefore, the hydraulic pressure supply device 100 may be controlled according to an output of the hydraulic flow path pressure sensor PS1 to control a flow rate delivered to the wheel cylinder 40. In particular, a distance and a speed of forward movement of the hydraulic piston 114 may be adjusted so that a flow rate discharged from the wheel cylinder 40 and a discharge speed thereof may be controlled.

Meanwhile, the low pressure mode may be switched to the high pressure mode before the hydraulic piston 114 is moved maximally forward.

In the high pressure mode, the third control valve 233 may be switched to the open state to open the fifth hydraulic flow path 215. Accordingly, the hydraulic pressure generated in the first pressure chamber 112 may be delivered to the second pressure chamber 113 through the fifth hydraulic flow path 215 connected to the second hydraulic flow path 212, and thus may be used to push the hydraulic piston 114.

In the high pressure mode, since a portion of the oil discharged from the first pressure chamber 112 flows into the second pressure chamber 113, a rate of increase in pressure per stroke is decreased. However, since a portion of the hydraulic pressure generated in the first pressure chamber 112 is used to push the hydraulic piston 114, a maximum pressure is increased. At this point, the reason for the increase of the maximum pressure is that a volume per stroke of the hydraulic piston 114 in the second pressure chamber 113 is less than that of the hydraulic piston 114 in the first pressure chamber 112.

Next, a case of releasing a braking force in a braking state established when the electric brake system 1 according to the embodiment of the present disclosure operates normally will be described.

When pedal effort applied to the brake pedal 10 is released, the motor 120 generates a rotational force in a direction opposite that when the braking operation is performed to deliver the generated rotational force to the power converter 130, and the worm shaft 131 of the power converter 130, the worm wheel 132 thereof, and the drive shaft 133 thereof are rotated in a direction opposite that when the braking operation is performed to move backward and return the hydraulic piston 114 to its original position, thereby releasing the pressure of the first pressure chamber 112 or generating a negative pressure therein. Further, the hydraulic pressure supply unit 110 receives the hydraulic pressure discharged from the wheel cylinders 40 through the first and second hydraulic pressure circuits 201 and 202 to deliver the received hydraulic pressure to the first pressure chamber 112.

Specifically, the negative pressure generated in the first pressure chamber 112 causes the hydraulic pressure of each of the wheel cylinders 40 provided at the two wheels FR and RL to be released through the first hydraulic flow path 211 and the second hydraulic flow path 212 which are connected to the first communicating hole 111a. At this point, the first and second inlet valves 221a and 221b, which are respectively installed at two flow paths branching from the second hydraulic flow path 212, are provided in the open state. Also, the first and second outlet valves 222a and 222b installed at flow paths branching from the two flow paths, which branch from the second hydraulic flow path 212, are maintained in the closed state to prevent oil in the reservoir 30 from flowing into the second hydraulic flow path 212.

Further, the negative pressure generated in the first pressure chamber 112 causes the hydraulic pressure of each of the wheel cylinders 40 provided at the two wheels FL and RR to be released through the first hydraulic flow path 211 and the third hydraulic flow path 213 which are connected to the first communicating hole 111a. At this point, the third and fourth inlet valves 221c and 221d, which are respectively installed at two flow paths branching from the third hydraulic flow path 213, are provided in the open state. Also, the third and fourth outlet valves 222c and 222d installed at flow paths branching from the two flow paths, which branch off from the third hydraulic flow path 213, are maintained in the closed state to prevent oil in the reservoir 30 from flowing into the third hydraulic flow path 213.

Further, the third control valve 233 may be switched to the open state to open the fifth hydraulic flow path 215, the fifth control valve 235 may be switched to the open state to open the seventh hydraulic flow path 217, and the sixth control valve 236 may be switched to the open state to open the eighth hydraulic flow path 218. The fifth hydraulic flow path

215, the seventh hydraulic flow path 217, and the eighth hydraulic flow path 218 communicate with one another so that the first pressure chamber 112 and the second pressure chamber 113 communicate with each other.

The hydraulic piston 114 should be moved backward to generate the negative pressure in the first pressure chamber 112, and, when the second pressure chamber 113 is completely filled with the oil, resistance occurs while the hydraulic piston 114 is moved backward. At this point, when the third control valve 233, the fifth control valve 235, and the sixth control valve 236 are opened to enable the fourth hydraulic flow path 214 and the fifth hydraulic flow path 215 to communicate with the second hydraulic flow path 212 and the first hydraulic flow path 211, the oil in the second pressure chamber 113 is moved to the first pressure chamber 112.

Further, the third dump valve 243 may be switched to the closed state. The third dump valve 243 is closed so that the oil in the second pressure chamber 113 may be discharged through only the fourth hydraulic flow path 214. However, in some cases, the third dump valve 243 may be maintained in the open state so that the oil in the second pressure chamber 113 may flow into the reservoir 30.

Also, when the negative pressure delivered to the first and second hydraulic pressure circuits 201 and 202 is measured as being higher than a target pressure releasing value according to an amount of release of the brake pedal 10, one or more among the first to fourth outlet valves 222 may be opened to control the negative pressure to converge on the target pressure releasing value.

Also, when the hydraulic pressure is generated in the hydraulic pressure supply device 100, the first and second cut valves 261 and 262, which are respectively installed at the first and second backup flow paths 251 and 252 respectively connected to the first and second hydraulic pressure ports 24*a* and 24*b* of the master cylinder 20, are closed so that the negative pressure generated in the master cylinder 20 is not delivered to the hydraulic pressure control unit 200.

In the high pressure mode, the oil in the second pressure chamber 113 is moved to the first pressure chamber 112 together with the oil in the wheel cylinder 40 by the negative pressure in the first pressure chamber 112 which is generated while the hydraulic piston 114 is moved backward so that a rate of pressure decrease of the wheel cylinder 40 is small. Therefore, a rapid pressure release may be difficult in the high pressure mode.

For this reason, the high pressure mode may be executed in only a high pressure situation, and may be switched to the low pressure mode when a pressure is lowered below a predetermined level.

Next, a state in which an anti-lock brake system (ABS) is operated through the electric brake system 1 according to the embodiment of the present disclosure will be described.

When the motor 120 operates according to pedal effort of the brake pedal 10, a rotational force of the motor 120 is transmitted to the hydraulic pressure supply unit 110 through the power converter 130 to generate a hydraulic pressure. At this point, the first and second cut valves 261 and 262 are closed, and thus the hydraulic pressure discharged from the master cylinder 20 is not delivered to the wheel cylinders 40.

Since a hydraulic pressure is generated in the first pressure chamber 112 while the hydraulic piston 114 is moved forward and the fourth inlet valve 221*d* is provided in the open state, the hydraulic pressure delivered through the first hydraulic flow path 211 and the third hydraulic flow path 213 operates the wheel cylinder 40 located at the front left wheel FL to generate a braking force.

At this point, the first to third inlet valves 221*a*, 221*b*, and 221*c* are switched to the closed state and the first to fourth outlet valves 222*a*, 222*b*, 222*c*, and 222*d* are maintained in the closed state. Further, the third dump valve 243 is provided in the open state, and thus the second pressure chamber 113 is filled with oil flowing from the reservoir 30.

Since a hydraulic pressure is generated in the second pressure chamber 113 while the hydraulic piston 114 is moved backward and the first inlet valve 221*a* is provided in the open state, the hydraulic pressure delivered through the fourth hydraulic flow path 214 and the second hydraulic flow path 212 operates the wheel cylinder 40 located at the front right wheel FR to generate a braking force.

At this point, the second to fourth inlet valves 221*b*, 221*c*, and 221*d* are switched to the closed state and the first to fourth outlet valves 222*a*, 222*b*, 222*c*, and 222*d* are maintained in the closed state.

That is, the electric brake system 1 according to the embodiment of the present disclosure may independently control operations of the motor 120 and each of the valves 54, 60, 221*a*, 221*b*, 221*c*, 221*d*, 222*a*, 222*b*, 222*c*, 222*d*, 233, 235, 236, and 243 to selectively deliver or discharge the hydraulic pressure to or from the wheel cylinder 40 of each of the wheels RL, RR, FL, and FR according to a required pressure such that a precise control of the hydraulic pressure may be possible.

Next, a case in which such the electric brake system 1 operates abnormally (that is, a fallback mode) will be described.

When the electric brake system 1 operates abnormally, each of the valves 54, 60, 221*a*, 221*b*, 221*c*, 221*d*, 222*a*, 222*b*, 222*c*, 222*d*, 233, 235, 236, and 243 is provided in an initial state of braking, which is a non-operating state.

When a driver pressurizes the brake pedal 10, the input rod 12 connected to the brake pedal 10 is moved forward and the first piston 21*a* in contact with the input rod 12 is simultaneously moved forward, and thus the second piston 22*a* is also moved forward by the pressurization or movement of the first piston 21*a*. At this point, since there is no gap between the input rod 12 and the first piston 21*a*, the braking may be rapidly performed.

Further, the hydraulic pressure discharged from the master cylinder 20 is delivered to the wheel cylinders 40 through the first and second backup flow paths 251 and 252 which are connected for the purpose of backup braking, thereby realizing a braking force.

At this point, the first and second cut valves 261 and 262, which are respectively installed at the first and second backup flow paths 251 and 252, and the inlet valves 221 configured to open and block the flow paths of the first hydraulic pressure circuit 201 and the second hydraulic pressure circuit 202 are configured with normally open type solenoid valves, and the simulator valve 54 and the outlet valves 222 are configured with normally closed type solenoid valves so that the hydraulic pressure is directly delivered to the four wheel cylinders 40. Therefore, braking is stably realized to improve braking safety.

The electric brake system 1 according to the embodiment of the present disclosure may discharge a braking pressure provided to only corresponding wheel cylinders 40 through the first to fourth outlet valves 222*a*, 222*b*, 222*c*, and 222*d*.

When the first to fourth inlet valves 221*a*, 221*b*, 221*c*, and 221*d* are switched to the closed state, the first to third outlet valves 222*a*, 222*b*, and 222*c* are maintained in the closed state, and the fourth outlet valve 222*d* is switched to the open state, the hydraulic pressure discharged from the wheel cylinder 40 installed at the front left wheel FL is discharged to the reservoir 30 through the fourth outlet valve 222*d*.

The reason for the hydraulic pressure in the wheel cylinders 40 being discharged through the outlet valves 222 is that a pressure in the reservoir 30 is less than that in the wheel cylinder 40. Generally, the pressure in the reservoir 30 is provided as atmospheric pressure. Since the pressure in the wheel cylinder 40 is generally significantly higher than atmospheric pressure, the hydraulic pressure of the wheel cylinders 40 may be rapidly discharged to the reservoirs 30 when the outlet valves 222 are opened.

Meanwhile, the fourth outlet valve 222*d* is opened to discharge the hydraulic pressure of the corresponding wheel cylinder 40 and the first to third inlet valves 221*a*, 221*b*, and 221*c* are simultaneously maintained in the open state so that the hydraulic pressure may be supplied to the three remaining wheels FR, RL, and RR.

Further, a flow discharged from the wheel cylinder 40 is increased as a difference in pressure between the wheel cylinder 40 and the first pressure chamber 112 becomes larger. As one example, as a volume of the first pressure chamber 112 is increased while the hydraulic piston 114 is moved backward, a larger amount of a flow may be discharged from the wheel cylinder 40.

As described above, each of the valves 221*a*, 221*b*, 221*c*, 221*d*, 222*a*, 222*b*, 222*c*, 222*d*, 233, 235, 236, and 243 of the hydraulic pressure control unit 200 may be independently controlled to selectively deliver or discharge the hydraulic pressure to and from the wheel cylinder 40 of each of the wheels RL, RR, FL, and FR according to a required pressure such that a precise control of the hydraulic pressure may be possible.

Next, a state in which the electric brake system 1 according to the embodiment of the present disclosure operates in a balance mode will be described.

The balance mode may be executed when an imbalance in pressure between the first pressure chamber 112 and the second pressure chamber 113 occurs. As one example, the ECU may sense an imbalanced state in pressure by detecting the hydraulic pressure of the first hydraulic pressure circuit 201 and the hydraulic pressure of the second hydraulic pressure circuit 202 from the hydraulic flow path pressure sensor PS1.

In the balance mode, a balancing process may be performed to balance pressure between the first and second pressure chambers 112 and 113 of the hydraulic pressure supply unit 110 by bringing the first and second pressure chambers 112 and 113 into communication with each other. Generally, pressure between the first pressure chamber 112 and the second pressure chamber 113 is balanced. As one example, in the case of a braking situation in which the hydraulic piston 114 is moved forward to apply a braking force, only a hydraulic pressure of the first pressure chamber 112 of the two pressure chambers is delivered to the wheel cylinders 40. However, in such a braking situation, since oil in the reservoir 30 is delivered to the second pressure chamber 113 through the second dump flow path 117, a balance in pressure between the two pressure chambers is still maintained. Conversely, in the case of a braking situation in which the hydraulic piston 114 is moved backward to apply a braking force, only a hydraulic pressure of the second pressure chamber 113 of the two pressure chambers is delivered to the wheel cylinders 40. However, in such a braking situation, since the oil in the reservoir 30 is delivered to the first pressure chamber 112 through the first dump flow path 116, the balance in pressure between the two pressure chambers is still maintained.

However, when a leak occurs due to a repetitive operation of the hydraulic pressure supply device 100 or an ABS operation is abruptly performed, an imbalance in pressure between the first pressure chamber 112 and the second pressure chamber 113 may occur. That is, the hydraulic piston 114 may not be located at a calculated position and may cause an incorrect operation.

Hereinafter, an example in which a pressure in the first pressure chamber 112 is greater than that in the second pressure chamber 113 will be described. The hydraulic piston 114 is moved forward when the motor 120 operates, and during such a procedure, a pressure between the first pressure chamber 112 and the second pressure chamber 113 is balanced. When the pressure in the second pressure chamber 113 is greater than that in the first pressure chamber 112, the hydraulic pressure in the second pressure chamber 113 is delivered to the first pressure chamber 112 to balance the pressures.

In the balance mode, the third control valve 233 and the sixth control valve 236 may be switched to the open state, thereby opening the fifth hydraulic flow path 215 and the eighth hydraulic flow path 218. That is, the second hydraulic flow path 212, the eighth hydraulic flow path 218, the seventh hydraulic flow path 217, and the fifth hydraulic flow path 215 are connected to one another, thereby communicating the first pressure chamber 112 with the second pressure chamber 113. Accordingly, the pressure between the first pressure chamber 112 and the second pressure chamber 113 is balanced. At this point, to promote the balancing process, the motor 120 may operate to move the hydraulic piston 114 forward or backward.

Next, a state in which the electric brake system 1 according to the embodiment of the present disclosure operates in an inspection mode will be described.

When the electric brake system 1 operates abnormally, each of the valves 54, 60, 221*a*, 221*b*, 221*c*, 221*d*, 222*a*, 222*b*, 222*c*, 222*d*, 233, 235, 236, and 243 is provided in the initial state of braking, that is, the non-operating state, and the first and second cut valves 261 and 262, which are respectively installed at the first and second backup flow paths 251 and 252, and each of the inlet valves 221 provided at an upstream side of the wheel cylinder 40 provided at each of the wheels RR, RL, FR, and FL are opened so that the hydraulic pressure is directly delivered to the wheel cylinders 40.

At this point, the simulator valve 54 is provided in the closed state so that a leak of the hydraulic pressure delivered to the wheel cylinders 40 through the first backup flow path 251 into the reservoir 30 through the simulation device 50 is prevented. Therefore, a driver steps on the brake pedal 10 so that the hydraulic pressure discharged from the master cylinder 20 is delivered to the wheel cylinders 40 without loss to ensure stable braking.

However, when a leak occurs at the simulator valve 54, a portion of the hydraulic pressure discharged from the master cylinder 20 may be lost to the reservoir 30 through the simulator valve 54. The simulator valve 54 is provided to be closed in an abnormal mode, and the hydraulic pressure discharged from the master cylinder 20 pushes the reaction force piston 52 of the simulation device 50 so that a leak may occur at the simulator valve 54 due to a pressure formed at a rear end of the simulation chamber 51.

Accordingly, when the leak occurs at the simulator valve 54, it may be difficult to obtain a braking force intended by the driver. Consequently, a problem of braking safety may occur.

The inspection mode is a mode in which whether there is a loss of pressure is detected by generating a hydraulic pressure in the hydraulic pressure supply device 100 to detect whether a leak occurs at the simulator valve 54. When the hydraulic pressure discharged from the hydraulic pressure supply device 100 is delivered to the reservoir 30 and causes a pressure loss, it is difficult to identify whether a leak occurs at the simulator valve 54.

Therefore, in the inspection mode, the inspection valve 60 may be closed, and thus a hydraulic pressure circuit connected to the hydraulic pressure supply device 100 may be configured as a closed circuit. That is, the inspection valve 60, the simulator valve 54, and the outlet valves 222 are closed, and thus the flow paths connecting the hydraulic pressure supply device 100 to the reservoirs 30 are closed so that the closed circuit may be configured.

The electric brake system 1 according to the embodiment of the present disclosure may provide a hydraulic pressure to only the first backup flow path 251 which is connected to the simulation device 50 among the first and second backup flow paths 251 and 252 in the inspection mode. Therefore, to prevent delivery of the hydraulic pressure discharged from the hydraulic pressure supply device 100 to the master cylinder 20 along the second backup flow path 252, the second cut valve 262 may be switched to the closed state in the inspection mode. Also, the fifth control valve 235 connecting the first hydraulic pressure circuit 201 to the second hydraulic pressure circuit 202 is maintained in the closed state and the sixth control valve 236 communicating the fifth hydraulic flow path 215 with the second hydraulic flow path 212 is closed so that a leak of the hydraulic pressure in the second pressure chamber 113 into the first pressure chamber 112 may be prevented.

In the inspection mode, at an initial state of each of the valves 54, 60, 221a, 221b, 221c, 221d, 222a, 222b, 222c, 222d, 233, 235, 236, and 243 provided at the electric brake system 1 of the present disclosure, the first to fourth inlet valves 221a, 221b, 221c, and 221d and the second cut valve 262 may be switched to the closed state, and the first cut valve 261 and the third control valve 233 are maintained in the open state so that the hydraulic pressure generated in the hydraulic pressure supply device 100 may be delivered to the master cylinder 20.

The inlet valves 221 are closed so that delivery of the hydraulic pressure of the hydraulic pressure supply device 100 to the first and second hydraulic pressure circuits 201 and 202 may be prevented, the second cut valve 262 is switched to a closed state so that circulation of the hydraulic pressure of the hydraulic pressure supply device 100 along the first backup flow path 251 and the second backup flow path 252 may be prevented, and the inspection valve 60 is switched to the closed state so that a leak of the hydraulic pressure supplied to the master cylinder 20 into the reservoir 30 may be prevented.

In the inspection mode, after generating the hydraulic pressure in the hydraulic pressure supply device 100, the ECU may analyze a signal transmitted from the backup flow path pressure sensor PS2 configured to measure an oil pressure of the master cylinder 20 to sense whether a leak occurs at the simulator valve 54. As one example, when the measurement result of the backup flow path pressure sensor PS2 indicates no occurrence of loss, it may be determined that a leak of the simulator valve 54 does not exist, and otherwise, when the measurement result thereof indicates the occurrence of loss, it may be determined that a leak exists at the simulator valve 54.

Figure 4:
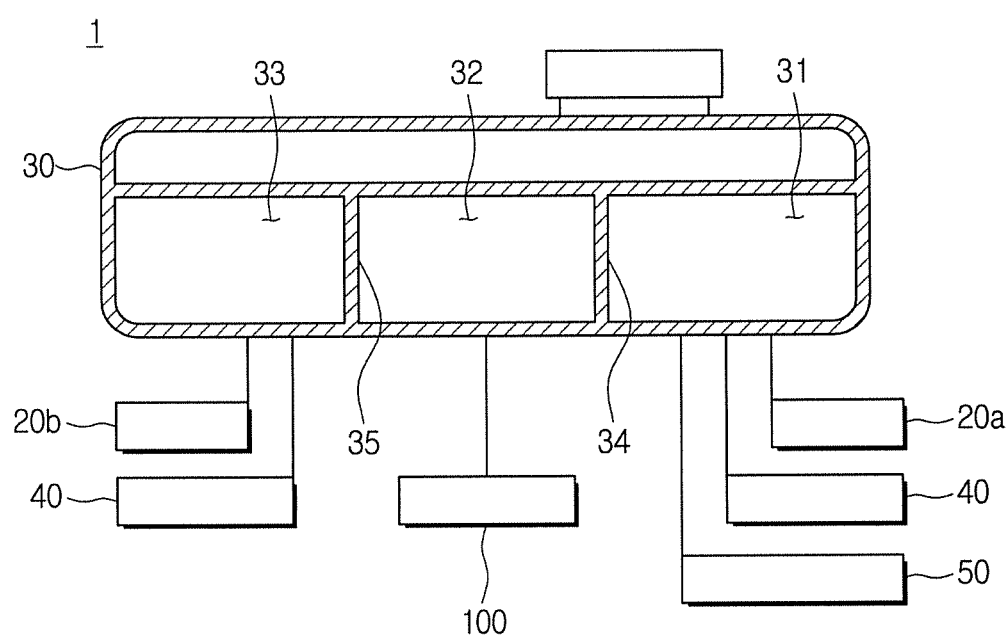
FIG. 4 is an enlarged diagram illustrating a connection relationship between a reservoir and a hydraulic pressure circuit according to the embodiment of the present disclosure.

Next, a connection relationship between the reservoir 30 and the hydraulic pressure circuit according to the embodiment of the present disclosure will be described with reference to FIG. 4. FIG. 4 is an enlarged diagram illustrating a connection relationship between the reservoir 30 and a hydraulic pressure circuit according to the embodiment of the present disclosure.

The reservoir 30 according to the embodiment of the present disclosure may include three reservoir chambers 31, 32, and 33. As one example, the three reservoir chambers 31, 32, and 33 may be disposed in a column.

Adjacent reservoir chambers 31, 32, and 33 may be separated by partition walls 34 and 35. For example, the first reservoir chamber 31 and the second reservoir chamber 32 may be divided by the first partition wall 34, and the second reservoir chamber 32 and the third reservoir chamber 33 may be divided by the second partition wall 35.

Further, the first partition wall 34 and the second partition wall 35 are partially open so that the first to third reservoir chambers 31, 32, and 33 may communicate with each other. Accordingly, pressures in the first to third reservoir chambers 31, 32, and 33 may be equal. As one example, the pressures in the first to third reservoir chambers 31, 32, and 33 may be equal to atmospheric pressure.

The first reservoir chamber 31 may be connected to the first master chamber 20a of the master cylinder 20, the wheel cylinder 40, and the simulation device 50. Referring to FIG. 1, the first reservoir chamber 31 may be connected to the first master chamber 20a through the first reservoir flow path 61. Further, the first reservoir chamber 31 may be connected to two of the four wheel cylinders 40, for example, the two wheel cylinders 40 provided at the front right wheel FR and the rear left wheel RL.

Further, a connection between the first reservoir chamber 31 and the first master chamber 20a may be controlled by the check valve 64 and an inspection valve 60, a connection between the first reservoir chamber 31 and the simulation device 50 may be controlled by the simulator valve 54 and the simulator check valve 55, and a connection of the first reservoir chamber 31 and the two wheel cylinders 40 may be controlled by the first and second outlet valves 222a and 222b.

Also, the second reservoir chamber 32 may be connected to the hydraulic pressure supply device 100. Referring to FIG. 1, the second reservoir chamber 32 may be connected to the first pressure chamber 112 and the second pressure chamber 113 of the hydraulic pressure supply unit 110. Specifically, the second reservoir chamber 32 may be connected to the first pressure chamber 112 through the first dump flow path 116 and to the second pressure chamber 113 through the second dump flow path 117.

Alternatively, unlike the drawings, the second reservoir chamber 32 may be connected to various hydraulic pressure supply devices. As one example, the second reservoir chamber 32 may be connected to a pump.

Also, the third reservoir chamber 33 may be connected to the second master chamber 20b of the master cylinder 20 and the wheel cylinder 40. Referring to FIG. 1, the third reservoir chamber 33 may be connected to the second master chamber 20b through the second reservoir flow path 62. Also, the third reservoir chamber 33 may be connected to the remaining two of the four wheel cylinders 40, for example, the two wheel cylinders 40 provided at the rear right wheel RR and the front left wheel FL.

Further, a connection between the third reservoir chamber 33 and the remaining two wheel cylinders 40 may be controlled by the third and fourth outlet valves 222c and 222d.

The reservoir 30 according to the embodiment of the present disclosure may be provided such that the second reservoir chamber 32 connected to the hydraulic pressure supply device 100 is separated from first and third reservoir chambers 31 and 33 respectively connected to the first and second master chambers 20a and 20b. In the case in which the second reservoir chamber 32 configured to supply oil to the hydraulic pressure supply device 100 and the first and third reservoir chambers 31 and 33 configured to supply oil to the master chambers 20a and 20b are provided in the same way, when the second reservoir chamber 32 does not properly supply the oil to the hydraulic pressure supply device 100, the first and third reservoir chambers 31 and 33 also do not properly supply oil to the master chambers 20a and 20b.

Therefore, the reservoir 30 according to the embodiment of the present disclosure is capable of performing emergency braking by providing the second reservoir chamber 32 to be separate from the first and third reservoir chambers 31 and 33 to allow the reservoir 30 to normally supply oil to the first and second master chambers 20a and 20b in an emergency situation in which the oil is not properly supplied to the hydraulic pressure supply device 100.

Similarly, the reservoir 30 according to the embodiment of the present disclosure may be configured such that the first reservoir chamber 32 connected to the first master chamber 20a is separated from the third reservoir chamber 33 connected to the second master chamber 20b. In the case in which the first reservoir chamber 31 configured to supply oil to the master chamber 20a and the third reservoir chamber 33 configured to supply oil to the master chamber 20b are provided in the same way, when the first reservoir chamber 31 does not properly supply oil to the master chamber 20a, the third reservoir chamber 33 also does not properly supply oil to the master chamber 20b.

Therefore, in the reservoir 30 according to the embodiment of the present disclosure, the first reservoir chamber 31 and the third reservoir chamber 33 are separately provided so that, in an emergency situation in which the oil is not properly supplied to the first master chamber 20a, the reservoir 30 normally supplies the oil to the second master chamber 20b such that a braking pressure may be generated at two among the four wheel cylinders 40.

Also, the reservoir 30 according to the embodiment of the present disclosure may be configured such that an oil line connected from the hydraulic pressure supply device 100 to the reservoir 30 is separated from a dump line connected from the wheel cylinder 40 to the reservoir 30.

As a result, a flow of bubbles which may occur in the dump line while ABS braking is performed into the first and second pressure chambers 112 and 113 of the hydraulic pressure supply device 100 may be prevented such that deterioration of ABS performance may be prevented.

As should be apparent from the above description, the electric brake system according to the embodiments of the present disclosure is capable of maintaining braking efficiency of a hydraulic pressure supply device while electronic control is performed by separately providing a reservoir chamber connected to a master cylinder and a reservoir chamber connected to the hydraulic pressure supply device.

Also, a reservoir chamber connected to a master cylinder is provided to be separate from a reservoir chamber connected to a hydraulic pressure supply device, and thus when a problem occurs in supplying oil from the reservoir to the hydraulic pressure supply device, the oil can be supplied normally to the master cylinder so that braking stability can be improved.

In addition, a reservoir chamber connected to a wheel cylinder is provided to be separate from a reservoir chamber connected to a hydraulic pressure supply device, and thus a flow of bubbles generated in a dump line of the wheel cylinder into a chamber of the hydraulic pressure supply device is prevented so that braking operation can be maintained.

Although the present disclosure has been described above by way of specific embodiments and the accompanying drawings, the present disclosure is not limited thereto, and it should be understood that numerous modified embodiments can be devised by those skilled in the art without departing from the gist defined by the appended claims, and such modified embodiments may not be individually understood from the present disclosure.

What is claimed is:
1. An electric brake system comprising:
a reservoir configured to store oil;
a master cylinder connected to the reservoir, the master cylinder comprising first and second master chambers and first and second pistons respectively disposed at the first and second master chambers, and configured to discharge oil according to pedal effort of a brake pedal;
a hydraulic pressure supply device operated by an electrical signal and configured to generate a hydraulic pressure; and
a hydraulic pressure control unit configured to deliver the hydraulic pressure discharged from the hydraulic pressure supply device to a wheel cylinder disposed at each of wheels,
wherein the reservoir includes:
a first reservoir chamber connected to the first master chamber and configured to supply the oil thereto;
a second reservoir chamber connected to the hydraulic pressure supply device and configured to supply the oil thereto; and
a third reservoir chamber connected to the second master chamber and configured to supply the oil thereto,
wherein the first, second, and third reservoir chambers are separately arranged,
wherein the hydraulic pressure supply device generates the hydraulic pressure using a piston which is movably accommodated inside a cylinder block and operated by the electrical signal that is output in response to displacement of the brake pedal,
wherein the hydraulic pressure supply device includes a first pressure chamber arranged at a first side of the piston and connected to one or more wheel cylinders,
wherein the first pressure chamber is connected to the second reservoir chamber,
wherein the electric brake system further comprises:
a first hydraulic flow path communicating with the first pressure chamber;
a second hydraulic flow path branching from the first hydraulic flow path;
a third hydraulic flow path branching from the first hydraulic flow path;
a first hydraulic pressure circuit including first and second branching flow paths each branching from the second hydraulic flow path and connected to two wheel cylinders; and a second hydraulic pressure circuit including third and fourth branching flow paths each branching from the third hydraulic flow path and connected to two wheel cylinders, wherein the first and second branching flow paths are connected to the first reservoir chamber, and wherein the third and fourth branching flow paths are connected to the third reservoir chamber.

2. The electric brake system of claim 1, further comprising a simulation device configured to provide a reaction force according to the pedal effort of the brake pedal, simulation device comprising a simulation chamber connected to the master cylinder by a simulation flow path and configured to store the oil, wherein the first reservoir chamber is connected to the simulation device to supply the oil thereto.

3. The electric brake system of claim 2, wherein a connection between the first reservoir chamber and the simulation device is controlled by a check valve configured to allow a fluid to flow only into a rear end of the simulation chamber from the first reservoir chamber, and controlled by a simulator valve configured to control a bidirectional oil flow between the first reservoir chamber and the rear end of the simulation chamber.

4. The electric brake system of claim 3, wherein the simulation chamber is configured to store oil flowing from the first master chamber, and wherein the simulation device further comprises a reaction force piston disposed inside the simulation chamber and a reaction force spring that is configured to elastically support the reaction force piston.

5. The electric brake system of claim 1, wherein a connection between the first reservoir chamber and the first master chamber is controlled by a check valve configured to allow a fluid to flow only into the first master chamber from the first reservoir chamber, and controlled by an inspection valve configured to control a bidirectional oil flow between the first reservoir chamber and the first master chamber.

6. The electric brake system of claim 1, wherein the first reservoir chamber, the second reservoir chamber and the third reservoir chamber are separated by partition walls.

7. The electric brake system of claim 6, wherein the first reservoir chamber, the second reservoir chamber and the third reservoir chamber are arranged in a column.

8. The electric brake system of claim 1, wherein the hydraulic pressure supply device includes a second pressure chamber arranged at a second side of the piston and connected to one or more of the wheel cylinders, and wherein the electric brake system further comprises:
 a fourth hydraulic flow path communicating with the second pressure chamber;
 a fifth hydraulic flow path branching from the fourth hydraulic flow path and connected to the second hydraulic flow path;
 a sixth hydraulic flow path branching from the fourth hydraulic flow path and connected to the third hydraulic flow path.

9. The electric brake system, of claim 8, wherein a connection between the first reservoir chamber and the two wheel cylinders is controlled by first and second outlet valves respectively disposed at the first and second branching flow paths, and the first and second outlet valves are configured to control a bidirectional oil flow between the first reservoir chamber and the two wheel cylinders.

10. The electric brake system of claim 8, wherein a connection between the third reservoir chamber and the two wheel cylinders is controlled by third and fourth outlet valves respectively disposed at the third and fourth branching flow paths, and the third and fourth outlet valves are configured to control a bidirectional oil flow between the third reservoir chamber and the two wheel cylinders.

11. The electric brake system of claim 8, further comprising:
 a first backup flow path connecting the first master chamber and the first hydraulic pressure circuit;
 a second backup flow path connecting the second master chamber and the second hydraulic pressure circuit;
 a first cut valve disposed at the first backup flow path and configured to control the oil flow therein; and
 a second cut valve disposed at the first backup flow path and configured to control the oil flow therein.

12. The electric brake system of claim 11, further comprising:
 a simulation device coupled to the master cylinder and configured to provide a reaction force according to the pedal effort of the brake pedal;
 an electronic control unit (ECU) configured to control the valves on the basis of hydraulic pressure information and displacement information of the brake pedal; and
 a backup flow path pressure sensor installed between the second master chamber of the master cylinder and the second cut valve, wherein the simulation device further includes a simulator valve configured to open and close a flow path connecting a rear end of the simulation chamber and the reservoir, wherein the ECU operates the hydraulic pressure supply device in a state in which the simulator valve and the second cut valve are closed to generate a pressure in the first master chamber, and wherein, when a measured value of the backup flow path pressure sensor is less than an expected value, the ECU determines that a leak occurs at the simulator valve.

13. The electric brake system of claim 12, further comprising:
 a check valve disposed at a first reservoir flow path connecting the first reservoir chamber and the first master chamber and configured to allow a fluid to flow only in a direction from the first reservoir chamber to the first master chamber; and
 an inspection valve installed at a bypass flow path connecting front and rear sides of the check valve on the first reservoir flow path, wherein the ECU controls the inspection valve to be in a closed state before operating the hydraulic pressure supply device.

14. The electric brake system of claim 8, further comprising:
 a first control valve disposed at the second hydraulic flow path and configured to control an oil flow therein;
 a second control valve disposed at the third hydraulic flow path and configured to control an oil flow therein; and
 a third control valve disposed at the fifth hydraulic flow path and configured to control an oil flow therein.

15. The electric brake system of claim 14, wherein the first and second control valves are each provided with a check valve configured to allow oil to flow in a direction from the hydraulic pressure supply device to the wheel cylinders and block oil from flowing in a reverse direction, and the third control valve is provided with a solenoid valve configured to control a bidirectional oil flow between the hydraulic pressure supply device and the wheel cylinders.

16. The electric brake system of claim 1, wherein the hydraulic pressure supply device includes a second pressure chamber arranged at another side of the piston and connected to one or more of the wheel cylinders, and wherein the electric brake system further comprises:
- a first dump flow path configured to communicate with the first pressure chamber and connected to the second reservoir chamber; and
- a second dump flow path configured to communicate with the second pressure chamber and connected to the second reservoir chamber.

17. The electric brake system of claim 16, further comprising:
- a first dump valve provided with a check valve which is disposed at the first dump flow path, is configured to control the oil flow therein, and allows the oil to flow in the direction from the second reservoir chamber to the first pressure chamber, and blocks the oil from flowing in the opposite direction; and
- a second dump valve provided with a check valve which is disposed at the second dump flow path, is configured to control the oil flow therein, and allows the oil to flow in the direction from the second reservoir chamber to the second pressure chamber, and blocks the oil from flowing in the opposite direction.

18. The electric brake system of claim 17, further comprising a third dump valve disposed at a bypass flow path connecting an upstream side of the second dump valve to a downstream side thereof at the second dump flow path, wherein the third dump valve includes a solenoid valve configured to bidirectionally control an oil flow between the reservoir and the second pressure chamber.

* * * * *